United States Patent
Herrmann et al.

(10) Patent No.: US 10,393,345 B2
(45) Date of Patent: Aug. 27, 2019

(54) LIGHT GUIDING DEVICE, ILLUMINATION DEVICE, AND REAR VIEW DEVICE THEREWITH

(71) Applicant: SMR Patents S.à.r.l., Luxembourg (LU)

(72) Inventors: Andreas Herrmann, Stuttgart (DE); Daniel Fritz, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/057,157

(22) Filed: Aug. 7, 2018

(65) Prior Publication Data
US 2018/0340673 A1    Nov. 29, 2018

Related U.S. Application Data

(63) Continuation of application No. 15/916,650, filed on Mar. 9, 2018, which is a continuation of application No. 15/000,733, filed on Jan. 19, 2016.

(30) Foreign Application Priority Data

Jan. 19, 2015    (EP) ..................................... 15151604
Aug. 9, 2017    (DE) .................... 20 2017 104 776 U

(51) Int. Cl.
  *B60Q 1/26*    (2006.01)
  *B60Q 1/52*    (2006.01)
  (Continued)

(52) U.S. Cl.
  CPC .......... *F21V 7/0091* (2013.01); *B60Q 1/2607* (2013.01); *B60Q 1/2665* (2013.01);
  (Continued)

(58) Field of Classification Search
  CPC .......... F21V 7/00941; F21V 7/22; F21V 9/08; F21S 43/239; F21S 43/315; B60Q 1/2607;
  (Continued)

(56) References Cited

U.S. PATENT DOCUMENTS

| | | | | |
|---|---|---|---|---|
| 4,912,606 A | * | 3/1990 | Yamamoto | B60Q 1/2607 362/518 |
| 5,700,078 A | * | 12/1997 | Fohl | B60Q 1/0011 362/259 |
| 6,926,432 B2 | * | 8/2005 | Rodriguez Barros | B60Q 1/2665 362/494 |
| 7,097,334 B2 | * | 8/2006 | Ishida | F21S 41/147 362/516 |

(Continued)

*Primary Examiner* — Bryon T Gyllstrom
(74) *Attorney, Agent, or Firm* — Jones Day

(57) ABSTRACT

A light guiding device includes a light guide body including a light incoupling side for incoupling light from a light source, a light outcoupling side, and a plurality of light guiding funnels, each of the light guiding funnels being provided with a reflection side that deflects light from the light incoupling side to the light outcoupling side of the light guide body, where the light guiding funnels are provided with light adjustment by bundling or focusing light within light outcoupling windows at the light outcoupling side, and at least one of a length of the light guiding funnels, a width of the light guiding funnels, a number of the light guiding funnels, a surface structure of the reflection side of the light guiding funnels, or an optical means provided at or by the reflection side is adapted to the light outcoupling windows for providing illumination areas.

16 Claims, 6 Drawing Sheets

(51) Int. Cl.
  *B60R 1/12*     (2006.01)
  *F21V 7/00*     (2006.01)
  *F21V 7/22*     (2018.01)
  *F21V 8/00*     (2006.01)
  *F21V 9/08*     (2018.01)
  *F21S 43/14*    (2018.01)
  *F21S 43/31*    (2018.01)
  *F21S 43/239*   (2018.01)
  *F21S 43/249*   (2018.01)

(52) U.S. Cl.
  CPC ........... *B60Q 1/2696* (2013.01); *B60Q 1/525* (2013.01); *B60R 1/1207* (2013.01); *F21S 43/239* (2018.01); *F21S 43/315* (2018.01); *F21V 7/22* (2013.01); *F21V 9/08* (2013.01); *G02B 6/0046* (2013.01); *G02B 6/0055* (2013.01); *F21S 43/14* (2018.01); *F21S 43/249* (2018.01); *G02B 6/0078* (2013.01)

(58) Field of Classification Search
  CPC .... B60Q 1/2665; B60Q 1/2696; B60Q 1/525; B60Q 1/1207; G02B 6/0046; G02B 6/0055
  USPC .......................................................... 362/511
  See application file for complete search history.

(56) References Cited

U.S. PATENT DOCUMENTS

| | | | | |
|---|---|---|---|---|
| 7,331,694 B2 * | 2/2008 | Lee | ...................... | G02B 6/0018 |
| | | | | 362/231 |
| 7,350,930 B2 * | 4/2008 | Lee | ........................... | F21V 5/04 |
| | | | | 353/98 |
| 7,513,665 B2 * | 4/2009 | Chinniah | ............... | F21S 41/147 |
| | | | | 362/507 |
| 7,771,062 B2 * | 8/2010 | Kuhn | .................... | B60Q 1/2665 |
| | | | | 359/839 |
| 8,033,706 B1 * | 10/2011 | Kelly | ................... | G02B 6/0036 |
| | | | | 362/307 |
| 2004/0047161 A1 * | 3/2004 | Mochizuki | .............. | F21S 43/14 |
| | | | | 362/511 |
| 2004/0109105 A1 * | 6/2004 | Nagakubo | ............ | G02B 6/0055 |
| | | | | 349/65 |
| 2005/0195074 A1 * | 9/2005 | Kano | .................... | B60Q 1/2665 |
| | | | | 340/475 |
| 2013/0188377 A1 * | 7/2013 | Konishi | .................... | B60Q 1/04 |
| | | | | 362/511 |
| 2015/0055361 A1 * | 2/2015 | Ogata | ..................... | B60Q 1/28 |
| | | | | 362/511 |
| 2015/0131324 A1 * | 5/2015 | de Lamberterie | ... | G02B 6/0035 |
| | | | | 362/623 |
| 2016/0193955 A1 * | 7/2016 | Ogata | .................. | B60Q 1/0052 |
| | | | | 362/511 |

* cited by examiner

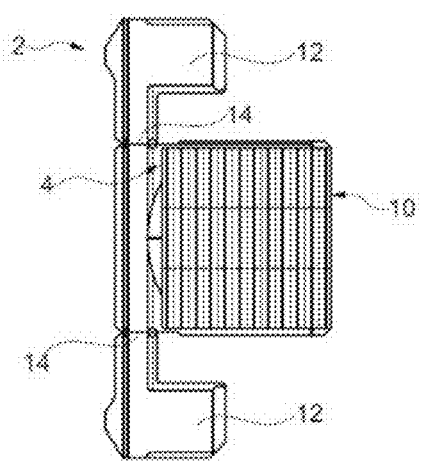
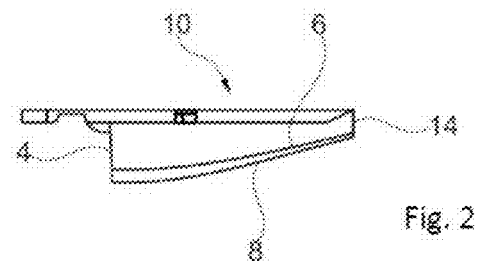
Fig. 1
Fig. 2
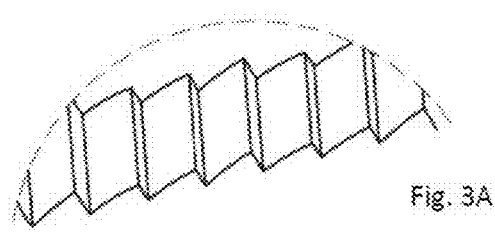
Fig. 3A
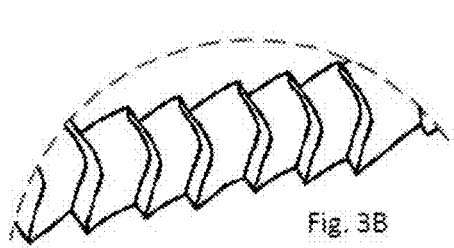
Fig. 3B
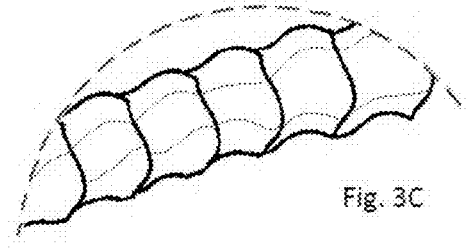
Fig. 3C

LIGHT GUIDING DEVICE, ILLUMINATION DEVICE, AND REAR VIEW DEVICE THEREWITH

CROSS-REFERENCE TO RELATED APPLICATIONS

This application is a continuation in part of U.S. patent application Ser. No. 15/916,650, filed Mar. 9, 2018, which is a continuation of U.S. patent application Ser. No. 15/000,733, filed Jan. 19, 2016, which claims the benefit of foreign priority to European Patent Application No. EP 15151604.4, filed Jan. 19, 2015, and this application claims the benefit of foreign priority to German Patent Application No. DE 20 2017 104 776, filed Aug. 9, 2017, each of which is hereby incorporated by reference in its entirety for all purposes.

BACKGROUND

1. Field of the Invention

The following description relates to a light guiding device for an illumination device, such as a backlight or interior or exterior lighting, where incident light is deflected by reflection. For example, the light guiding device can be used in an indicator of a motor vehicle, such as in connection with a blind spot monitor in an outside mirror. An illumination device, and an external rear view device for a motor vehicle having such a light guiding device and illumination device, respectively is also described.

In addition, the following description further relates to a light guide for use in a light emitting device of a vehicle, a light emitting device with the light guide, and a vehicle with a turn signal or a warning light which includes the light guide.

2. Related Art

In typical light guiding devices, it is disadvantageous that the light deflected by the light guiding device is out-coupled and is relatively inhomogeneous over a surface to be illuminated. This effect becomes ever more obvious with a larger surface being illuminated and a greater distance between the surface to be illuminated and the light source. For example, if a pictogram of small line width, 0.4 mm for example, of a blind spot monitor is backlit by a known light guiding device, the inhomogeneity can be negligible. As the line width of the pictogram increases, 1.0 mm for example, the inhomogeneity becomes quite visible and the user finds it disturbing. In the extreme case, a very non-uniform illumination of a pictogram can cause the user to misinterpret an illuminated indicator light as not illuminated.

The homogenous illumination of a pictogram, logo, icon or the like is also important for a logo lamp of a rear view device.

The term "rear view" is here defined as a view of the surrounding area, which is not in the field of view of a driver of a vehicle, i.e. the directions opposing, left, right, below and above of the viewing direction, but can also include the view in the direction of the viewing direction of the driver and/or any combinations of the directions. The rear view can be achieved via a reflective element like a mirror and/or an image acquisition means like a camera.

U.S. Pat. No. 7,600,905 B2 describes a light unit with two light conductor sections being located in a surface and a third light conductor section running outside or below the surface. The surface is modeled, for example, on a housing of an exterior mirror in which the light unit can be used. The light conductor sections extend from first ends to a second end in form of a junction. In the junction, all light conductor sections are connected with each other and form a decoupling region, from which light from lamps can be decoupled, the light of which in each case is coupled in a frontal area of the respective light conductor section at the respective first ends. The lamps preferably designed as LEDs can be arranged on a common, flat circuit board which is arranged parallel, perpendicular or inclined to the frontal area. The lamps can be arranged upright, in a horizontal position or also inclined on the circuit board. The lamps can project via coupling devices into the respective frontal areas or shine directly in the direction of their optic axis into the respective frontal areas without any additional coupling devices.

A display device for a motor vehicle configured to be disposed in a rear view device, such as an interior or exterior mirror, is described by US 2017/0090100. It includes at least one light source and at least one optical unit. The optical unit comprises at least one light-conducting body which comprises at least one coupling-in section through which light emitted by at the least one light source can be coupled into the light-conducting body; and at least one coupling-out section through which light can be coupled out of the light-conducting body. At least one optical means which at least in some sections is or can be secured to the light-conducting body such that it is overlaid on the surface of the at least one coupling-out section of the light-conducting body is provided. Also at least one optical element by means of which a beam path of at least the light passing through the at least one optical element can be deflected and/or split into light bundles which are scattered, is provided, wherein the at least one optical means comprises a plurality of optical elements of the at least one optical element which, when they are at the same distance or at a different distance from the coupling-in section of the light-conducting body, correspond in their refraction or reflection behavior and, in the opposite case, differ. The at least one optical element has an n-cornered, arrow-shaped, curved, or circular-arc-shaped cross section or a pyramid, dome-shaped, or elliptical contour. The cross section of the at least one optical element increases or decreases with increasing distance from the coupling-in section. The at least one coupling-out section of the light-conducting body comprises a plurality of coupling-out regions which are disposed offset in steps or in a sawtooth manner with respect to one another and on which one of the at least one optical elements is disposed.

WO 01/27529 A1 describes a light guide having an input edge surface, a back surface and an output surface, wherein a reflector is fastened directly to the back surface by gluing for example.

EP 2463157 A1 describes a rear view mirror assembly having at least one mirror base, a mirror head covering which covers a mirror glass in the mirror head, and an optical indicator light that produces light in reaction to a sensor signal to inform an operator about hazardous information, wherein the light shines through the mirror glass. The mirror glass is mounted on a backing plate that has a mounting space for at least one LED and at least one beveled light guide.

EP 1167870 A2 describes a lamp for vehicles, especially for motor vehicles, comprising a lamp housing that is bounded by a front disc in the emission direction, and at least one elongate light conduction element having a light exit surface on its front side, a reflection surface on its rear side facing away from the front side and a light input surface at one end which is coupled to a light source, wherein the light exit surface of the light conduction element is configured as part of the front disc.

DE 202012100398 describes an illumination apparatus having at least one illuminant that is arranged on a printed circuit board enabling it to be connected to a power supply, wherein the printed circuit board is at least partially imbedded in a transparent first casting compound that enables a selective light exit of the light generated by the illuminant over at least one light exit area. To this end the printed circuit board extends perpendicular to the light exit area, is arranged in and is at least partially surrounded by the first transparent casting compound, and at least one light influencing element having light-reflecting properties at least on one of its two main surfaces is arranged in the first casting compound.

EP 1970736 A1 describes a rear view mirror for vehicles, especially motor vehicles, having a mirror glass mounted to a carrier plate and an indicator unit which is disposed behind the mirror glass and the carrier plate and generates a light beam by means of at least one illuminant, wherein the light beam is coupled into a light conductor, which is provided with decoupling optics by which the light beam is directed outward by at least one portion of the mirror glass that is at least partially reflection-free, wherein the light passing through the mirror glass is directed towards the driver.

DE 10 2004 015 544 A1 describes the use of a light guide which is integrated in an outside mirror and part of a luminous display device in the outside mirror. A light-emitting diode is embedded in the light guide, and the light emanating from this is partially reflected one to several times at interfaces of the light guide. A rear of the interfaces is structured in small pieces, for example, by gradations, to direct the light of the LED in different directions. The light exits the unstructured front interface.

A disadvantage of this arrangement is that the light-emitting diode must be arranged in a recess in the middle of the light guide so that assembly and maintenance are difficult. Despite the small scale structuring, the entire angular range over which the light emerges is relatively small.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a light guiding device generates homogeneous specific illumination areas as required for illuminating a pictogram, logo, icon or the like. For example, a light guiding device may be provided that improves a homogenous light distribution on a light out-coupling surface within defined regions or windows.

In another aspect, a light guide is used in a light emitting device of a vehicle which is more flexible. In these examples, variable arrangements of a light source may be used.

The light guiding device may include a light incoupling side for coupling light from a light source into the light guiding device, a reflection side having a reflection layer for reflecting the incoupled light, and a light outcoupling side. The light outcoupling side may be preferably disposed essentially opposite the reflection side. The clearance between the reflection side and the light outcoupling side may decrease as the distance from the light incoupling side increases. This decrease of the clearance can occur at least partially non-linear. In other words, the reflection side and/or the reflection layer can not only extend linearly inclined relative to the light outcoupling side, but can also extend arc-shaped or convex. The reflection side is embodied so that the light arriving at the light outcoupling side from the light incoupling side may be deflected in order to thus produce a light distribution on the light outcoupling side that is more specific and uniform or is as uniform as possible.

The light guiding device may include a light guide body upon which the light incoupling side, the light outcoupling side and the reflection side are formed. The light guide body may be further be divided into discrete regions having independently operating light guiding funnels. Each independently operating light guiding funnel may provide homogenous illumination of a portion of the light outcoupling side to illuminate a target such as a logo or other pictogram for a specific purpose. In addition, each of the light guiding funnels may be further divided into discrete regions or focus areas within a particular funnel to provide a homogenous illumination over a portion of the light outcoupling side associated with a specific funnel. Alternatively, the light guiding funnels may be of different longitudinal or lateral dimensions yet each be configured to fully illuminate the respective light outcoupling regions associated therewith.

The light guiding device can be used in an illumination device to produce an illumination result over a certain surface that is as homogenous as possible by means of one or a plurality of light sources having a relatively limited light distribution, LEDs for example. The light guiding device can be used in an indicator device of a motor vehicle, for example. An example is an indicator device in a rear view device like a driver assistance system, such as a blind spot monitor. The light guiding device according to the invention can be used for the most homogenous possible illumination or backlighting of a pictogram, such as a blind spot monitor for example.

The reflection layer may be arranged on the reflection side. The reflection layer may be a paint or lacquer layer that is imprinted or evaporation-coated on the reflection side.

The reflection layer may be made of another material or of the same material as the rest of the light guiding device. Materials may include plastics, especially acrylonitrile-butadiene-styrene (ABS) and or polymethyl methacrylate (PMMA) or plastics with similar material properties. For example, both the reflection layer and the rest of the light guiding device may be made of PMMA. The light guiding device can also be a two-component plastic injection molded part, where the reflection layer is injected as an ABS plate, white or colored for example, and then the rest of the light guiding device is formed on the reflection layer with transparent or clear PMMA. Each tunnel may include the reflection layer.

The reflection side and/or the reflection layer may be structured or configured at least partially step-like and/or wave-like and/or with pillows providing optical means. The steps or waves or pillows are embodied so that the light arriving from the light incoupling side may be deflected so that it exits from the light outcoupling side simultaneously as uniformly as possible and within specific areas or windows. In embodiments having independently operating regions, each tunnel may have a specific reflection side and/or reflection layer. For example the step-like and/or wave-like configuration might be different for the different funnels and/or the respective configuration might be restricted to certain discrete funnel regions. Still further, a step-like and/or wave-like configuration can be provided in different directions, especially in both the longitudinal and the lateral directions, and can lead to a variety of 3 dimensional surface structures like a dome-, pillow- or cushion-like configuration.

The light incoupling side and the light outcoupling side can be configured flat and these surfaces can be arranged essentially orthogonal or approximately orthogonal to one another. The surfaces of the light incoupling side and the light outcoupling side can form planes. The upper surface of the light incoupling side can be embodied or shaped in such a manner that light arriving from a light source is coupled into the light guiding device as completely as possible and preferably as parallel to the light outcoupling side as possible. The light incoupling side can demonstrate one or a plurality of optical systems and/or recesses, where light sources can be at least partially inserted into the recesses.

The light guiding device can be embodied so that light coupled into the light guiding device and/or reflected and/or outcoupled essentially experiences no change in color. To this end, the reflection layer can be made of a color-neutral material, which is of bright color, in particular silvery or white. A change in color can be obtained by arranging one or a plurality of color filters on the light incoupling side and/or the reflection side and/or the reflection layer and/or the light outcoupling side and/or inside the light guiding device. The light from a light source that emits white light can thereby be coupled out of the light guiding device colored, red or yellow or green for example. A color layer can have a heat resistance of around −40° C. to +115° C.

The light outcoupling side of the light guide body, in particular in the region of light guiding funnels, can be grained to scatter light within the defined light outcoupling windows to further enhance homogeneity.

The light guiding device can furthermore demonstrate one or a plurality of holding devices to tightly or loosely fasten the light guiding device to a printed circuit board.

In another aspect, an illumination device includes a light guiding device including at least one of the aforementioned features and a printed circuit board upon which at least one light source is arranged. The light source may be arranged relative to the light guiding device so that the light emitted by the light source is at least partially incoupled on the light incoupling side of the light guiding device. The light may be subsequently reflected from the reflection side and/or the reflection layer and outcoupled on the light outcoupling side. The illumination device can be used in a motor vehicle, such as in an indicator device of a rear view device of a motor vehicle.

In another aspect, a motor vehicle includes a rear view reflection surface and/or camera, one or a plurality of illuminants and a light guiding device, wherein the illuminant and the light guiding device can be an indicator of a blind spot monitor. To this end, the light guiding device, light source and rear view reflection surface can be arranged together in such a way that the light guiding device deflects the light emitted by the light source to a side of the rear view reflection surface facing away from the driver of the vehicle. Thus one area of the rear view reflection surface can be visibly illuminated for the driver to provide an indicator function, a blind spot monitor, for example.

One region of the rear view reflection surface may include a recess or a partially reflecting part, such as a pictogram that the light source and the light guiding device visibly backlight for a driver.

In another aspect, a light guide for use in a light emitting device of a vehicle includes a coupling-in surface for coupling light into the light guide, a first reflection surface which reflects light striking it at least once from a first predetermined solid angle region at least partially, i.e. with an intensity that may decrease with respect to the intensity of the light rays incident from the first predetermined solid angle region. The reflection can take place for different frequencies of the light in different ways, and all subsequent statements about the light and its reflection apply to at least individual wavelengths or wavelength ranges. For example, they apply to the entire wavelength range of visible light, ie from about 380 nm and 750 nm.

The optical waveguide may further include a second reflection surface which, at least from a second predetermined solid angle region, at least simply and at least partially reflects light incident thereon, given the same definitions as for the first reflection surface.

The light guide may further include a coupling-out surface for coupling out light. The coupling surface, the first reflection surface, the second reflection surface and the decoupling surface may be designed and arranged relative to one another so that at least a first component (direction or intensity) of the light rays emerges at least when coupling in light beams in a predetermined irradiation direction via the coupling surface into the light guide. The first predetermined solid angle range may arrive at the first reflection surface, and may be at least simply and/or at least partially reflected by the latter so that all of the light rays or a part thereof (for example, those with lower intensity) reach the second reflection surface from the second predetermined spatial region. They may also be at least simply and/or at least partially reflected in such a way that in turn all these light rays or a part thereof (for example, those with lower intensity) reach the coupling-out surface and emerge from the light guide via the latter in an exit direction, which includes an obtuse angle with the direction of irradiation.

An obtuse angle may include an angle of between 90° and 180°. In connection with the reflection, this means that the exiting light beams may have a directional component which is opposite to the direction of irradiation. Due to the property of the light guide to reflect light almost back to the starting point, the light source in conjunction with the light guide can to some extent "radiate around the corner".

The coupling surface may be provided as an outer surface of the light guide, then the light source may be spaced apart, for example in a rearview device as hidden in a door mirror in a housing. This results in larger and new design options for the design of the review device.

The coupling-in surface, the second reflection surface and the decoupling surface may be configured and arranged relative to one another such that when light rays are coupled in a predetermined direction of irradiation, a second portion of the light rays (which is emitted in another direction, or also a fraction of the original one−total intensity) from the second predetermined spatial area forth on the second reflection surface and is at least easily and partially reflected from this such that light rays reach the decoupling surface and exit via this in an exit direction of the light guide, which includes an acute angle with the direction of irradiation. An acute angle may include less than 90°. With the second portion of the light rays, therefore, the range of directions for light radiation may be particularly wide, allowing for use in light emitting devices that need to be visible from many directions, such as in a turn signal of a vehicle.

The material of choice for optical fibers may include plastic, because it can be easily and inexpensively manufactured by (injection) casting techniques or other plastic processing methods. For example, the light guide may be completely made of plastic. Further, the plastic material may be homogeneous in its composition, density and transparency.

The design of the reflections and the light emission may vary if the first reflection surface and/or the second reflection surface are not flat, i.e. if they contain curved sections or are curved completely.

The first reflection surface and/or the second reflection surface may have a structuring such that upon impact of first and second light beams on different areas of the respective reflection surface, by at most 10% and preferably by at most 3% of a longest extent of diffused light guide, the first and second light beams are reflected in up to 15° from each other in different directions. In other words, it may be ensured by small-scale structuring that a whole fan is emitted to light rays.

The first reflection surface and/or the second reflection surface may have a structuring such that upon impact of the first and second light rays on different regions of the respective reflection surface which are not space apart by more than 2 mm, preferably by at most 1 mm, and more preferably by at most 0.5 mm, the first and second light beams may be reflected in different directions by up to 15° from each other.

A structuring may generally be designed so that the first reflection surface and/or the second reflection surface have a plurality of (preferably similar and particularly preferably identical) structures, which are formed as optical elements. Such structures may be in the form of prisms or cushions. For example, in the case of such prisms or structures which are not quite so perfect, they may each have at least two partial surfaces which are at an angle of between 80° and 100° to one another (i.e. are substantially perpendicular to one another). The prisms may have three faces, which are preferably exactly perpendicular to each other. In the case of modifications, the optical structures may have rounded corners and edges with respect to such angular forms.

Typically, the first reflection surface may be formed on or as an end face of the light guide, which is opposite to the coupling surface. The first reflection surface may have two partial surfaces which are at an angle of 90° to one another, where a first partial surface is at an angle of 135° to the direction of irradiation so that a total reflection occurs at the first reflection surface. In the case of a total reflection in the region of the first reflection surface, the loss of intensity of the light guide as a whole may be generally low. In the case of such an end face, it may also be desired that approximately adjacent to the first outcoupling surface, a second decoupling surface is arranged so that at least a portion of the non-reflected light beams exits the light guide when coupling light beams in a predetermined direction of irradiation via the coupling surface in the light guide. This may also make the range of radiation angles to be particularly wide.

The position of the outer surfaces of the reflection surfaces with respect to each other, the material used for the light guide, and potential small-scale structures on the reflective surface may vary. The intensity of the light rays which reach the outcoupling surface and exit via the outcoupling surface in an exit direction from the light guide, which may include an obtuse angle with the direction of irradiation, may amount to at least 25% of the intensity of the light coupled in via the coupling surface. In other words, at least a quarter of the intensity may be reflected back ("around the corner") to allow broad application of the light pipe.

The reflectivity may be aided by the fact that the first reflection surface and/or the second reflection surface may have a reflective coating.

In another aspect, a light-emitting device for a vehicle may include the light guide.

In another aspect, a vehicle may include a turn signal as a light emitting device includes the light guide.

In another aspect, a vehicle may include a warning light as a light-emitting device which has the light guide. This may be helpful in lane departure warning systems which are intended to radiate light inwards as a warning from the exterior mirror to the driver. The light source (lamp) may be arranged further inwards (closer to the vehicle body) than usual.

The light-emitting device may be arranged in an exterior rear view device and preferably in an exterior mirror.

Various aspects of this invention will become apparent to those skilled in the art from the following detailed description of the preferred embodiment, when read in light of the accompanying drawings.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIG. 1 is a diagram illustrating a top view of a first light guiding device.

FIG. 2 is a diagram illustrating a side view of the light guiding device of FIG. 1.

FIG. 3A is a diagram illustrating a reflection side or reflection layer having a step-like structure.

FIG. 3B is a diagram illustrating a reflection side or reflection layer having a combined step-like and wave-like structure.

FIG. 3C is a diagram illustrating a reflection side or reflection layer having a wave-like structure.

Figure 4:
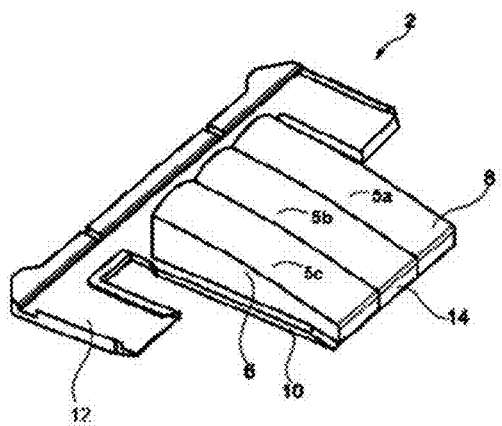
FIG. 4 is a diagram illustrating a perspective view of the light guiding device FIG. 1.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 depicts a top view of a light guiding device 2 having a light incoupling side 4, a reflection side 6, a reflection layer 8 (see FIG. 2), and a light outcoupling side 10. In the top view of FIG. 1 the reflection side 6 is disposed under the light outcoupling side 10 and the reflection layer 8 is disposed under the reflection side 6. The light outcoupling side 10 is disposed opposite the reflection side 6 and, therefore, also opposite the reflection layer 8 so that reflected light reaches the light outcoupling side 10 as uniformly as possible. The clearance between the light outcoupling side 10 and the reflection side 6 and, therefore, also the reflection layer 8 decreases as the distance from the light incoupling side 4 increases. The light outcoupling side 10 and the reflection side 6 can thus converge continuously or form an edge 14 that can also have a reflection layer 8.

By way of example FIG. 1 depicts two holding devices 12, which extend away from the light guiding device 2 in the plane of the light outcoupling side 10. Each holding device demonstrates a predetermined breaking point 14. Depending on the application of the light guiding device, in a right or a left rear view device of a motor vehicle for example, the unneeded holding device 12 can be separated; for example, broken off.

FIG. 2 depicts a side view of the light guiding device of FIG. 1. Light can enter the light guiding device 2 through the light incoupling side 4, such as parallel to the light outcoupling side 10. The reflection side 6 and the reflection layer 8 may then deflect the light in the direction of the light outcoupling side 10.

FIG. 3A depicts an enlarged representation of a reflection side 6 and/or reflection layer 8 configured step-like. Such a step-like configuration, which can alternatively or additionally be wave-like, can improve the guidance of the light beam arriving from the light incoupling side 4 to the effect that the light outcoupling by the light outcoupling side 10 is distributed as homogeneously as possible and uniformly across the light outcoupling side 10. FIG. 3B depicts an enlarged representation of the reflection side 6 configured as a combined wave-like and step-like surface configuration. FIG. 3C depicts an enlarged representation of the reflection side 6 configured as a compound wave-like surface configuration in both the longitudinal and lateral directions of the light outcoupling side 10.

FIG. 4 depicts the light guiding device 2 in a perspective representation. The light guiding device 2, which is optimized for three light sources 18, has a reflection side 6 and reflection layer 8 configured with three funnels, 5a, 5b and 5c; however, more or fewer funnels may be provided if so desired. Still further, the funnels do not have to be identical, but may vary. The longitudinal axis of these funnels may extend along the principal direction of the incoupled light. The light guiding device 2 can be adapted for any other number of light sources 18, such as 1, 2, 3, 4, 5, 6 or more. The amount of light sources may depend on the areas to be illuminated.

Figure 5:
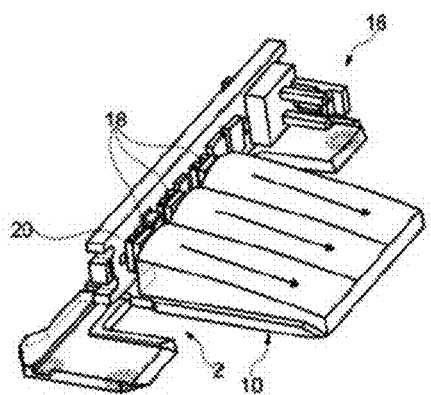
FIG. 5 is a diagram illustrating a perspective view of an illumination device having a light guiding device of FIG. 1 with focus on the light incoupling.
Figure 6:
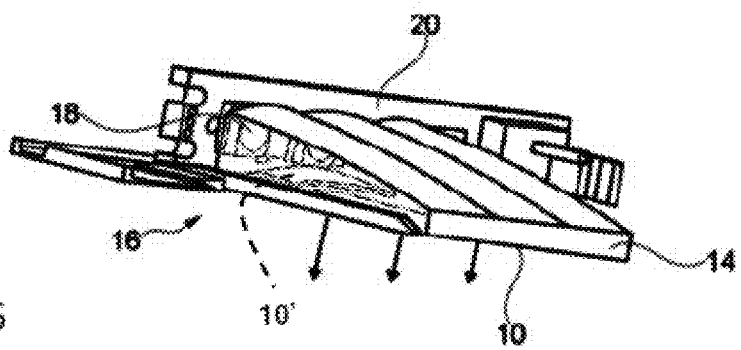
FIG. 6 is a diagram illustrating a perspective view of the illumination device of FIG. 5 with focus on the light outcoupling.

FIG. 5 depicts an illumination device 16 having three light sources 18 which are arranged on a printed circuit board 20. The printed circuit board 20 having the LED light sources 18 may be so arranged with respect to the light guiding device 2 that the light is emitted essentially parallel to the light outcoupling side 10, as illustrated by the arrows. To this end, the reflection side 6 and especially the reflection layer 8 deflect the light so that it leaves the light guiding device 2 via the light outcoupling side 10, as seen from the arrows in FIG. 6. As shown in a dotted outline, the light outcoupling side 10 may have a restricted light outcoupling window 10' that provides a homogeneous illumination output over an area less than the entire light outcoupling surface 10.

Figure 7A:
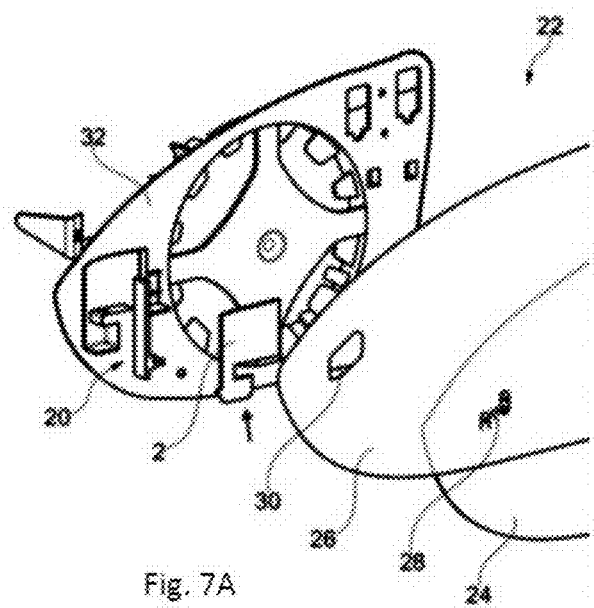
FIG. 7A is a diagram illustrating an exploded view of a rear view device having a light guiding device.

FIG. 7A depicts an explosion view of a rear view device 22 having a light guiding device 2, which can be arranged on a printed circuit board 20 or directly on a mounting 32. The rear view device 22 may furthermore include a rear view reflection surface 24 and a heating layer 26 thereunder, where the rear view reflection surface 24 has a pictogram for a blind spot monitor indicator, which can be illuminated by the light guiding device 2 and by a recess 30 in the heating layer 26. The printed circuit board 20, light guiding device 2 and rear view reflection surface 24 may include the heating layer 26 which can be arranged on a mounting 32. For the sake of clarity, the remaining parts of the rear view device 22, like the housing for example, are not illustrated.

Figure 7B:
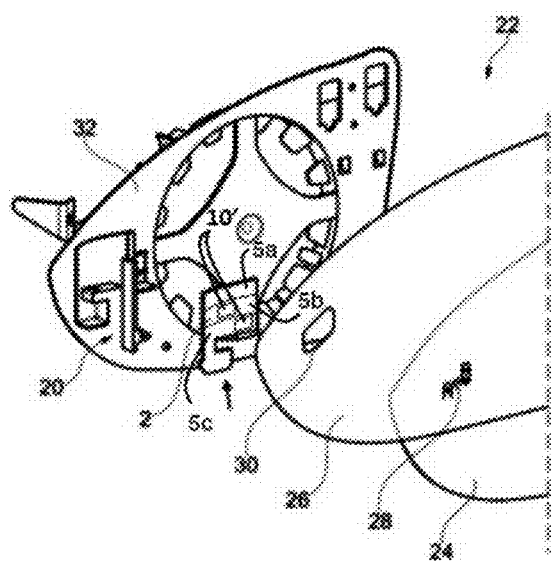
FIG. 7B is a diagram illustrating an exploded view of a rear view device, similar to FIG. 7A, having a selectively emitting light guiding device.

FIG. 7B depicts an exploded view of a rear view device 22, similar to that shown in FIG. 7. The rear view device may include a light guiding device 2 that includes restricted light outcoupling windows 10'. Each of the independently operable light guiding funnels 5a, 5b, and 5c may optionally include restricted light outcoupling windows 10' to illuminate a specific portion of the icon 28. As illustrated in FIG. 7B, fewer than all of the funnels 5a, 5b, and 5c may include one or more of the outcoupling windows 10' to illuminate select portions of the icon 28 or increase the illumination intensity of a portion of the icon. In the illustrated embodiment, the icon 28 may include three regions representing a first vehicle, a second vehicle and a region between the two vehicles. Each light source 18 with its associated light guiding funnel 5a, 5b or 5c and light outcoupling window 10' can serve to homogenously illuminate one icon region. The light guiding funnels 5a-5c, the associated light sources 18, and the optional restricted light outcoupling windows 10' may emit different colors or may be sequentially strobed to provide an animation component to the icon to improve visibility.

Figure 8:
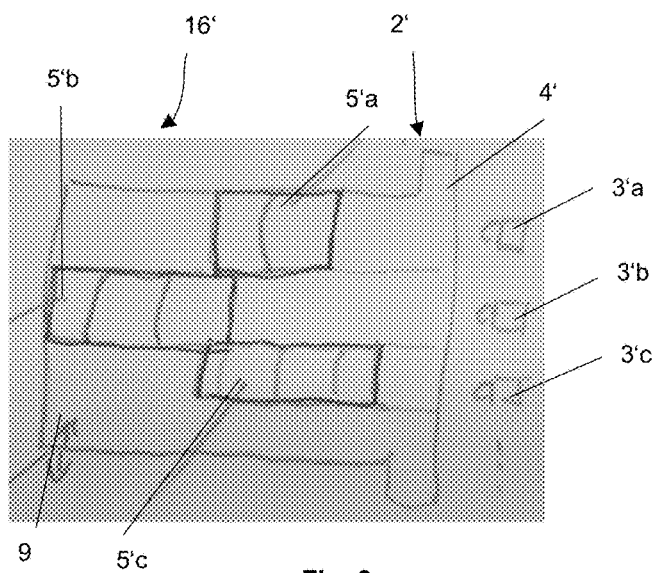
FIG. 8 is a diagram illustrating a bottom view of an illumination device with a selectively emitting light guiding device of the invention.

FIG. 8 depicts a further illumination device 16' with a light guiding device 2' selectively emitting light. The light guiding device 2' is cooperating with three light sources in form of three LEDs 3'a, 3'b and 3'c and has three funnels 5'a, 5'b and 5'c aligned thereto, with the funnels 5'a, 5'b and 5'c differing from each other as each is specially designed in dependency to a restricted light outcoupling window to be provided with a homogeneous illumination output. The longitudinal axes of these funnels 5'a, 5'b and 5'c may extend along the principal direction of the light emitted by the LEDs 3'a, 3'b and 3'c and incoupled at the light incoupling side 4' of the light guide body 9', but may be shifted with respect to each other and provided with different optical means on their reflection sides. The optical means may be further described with reference to FIGS. 9 and 10, respectively.

Figure 9:
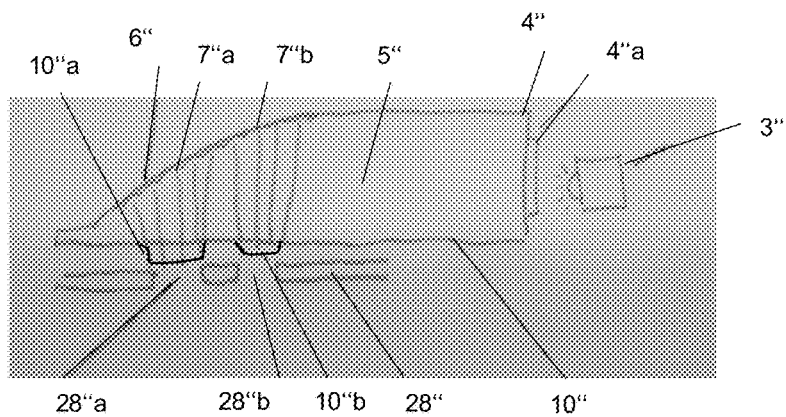
FIG. 9 is a diagram illustrating a cross sectional view of an alternative illumination device with a selectively emitting light guiding device of the invention.

FIG. 9 depicts a cross section with an LED 3", a light funnel 5" being provided with a lens 4"a at its light incoupling side 4" to optimize the light incoupling and optical elements 7"a and 7"b on its reflection side 6" to optimally reflect light into two light outcoupling windows 10"a and 10"b at the light outcoupling side 10", with the light outcoupling windows 10"a and 10"b being aligned with openings 28"a and 28"b provided within a mask 28" defining a logo. The optical elements 7"a and 7"b may provide, for example, a pillow structure focusing light into the two light outcoupling windows 10"a and 10"b. For that purpose, the optical elements 7"a and 7"b may deflect the light into different directions, and the light outcoupling side 10" preferably is grained to diffuse the outcoupled light, altogether resulting in a focused and homogenous illumination of the two light outcoupling windows 10"a and 10"b to provide a clear and bright logo when using the illumination device as a blind spot indicator lamp in a rear view device attached to a motor vehicle.

Thus, a light guiding device with a specific focus section for an optimal illumination of, for example, well defined logo areas. The number of light emitters, the number of light funnels as well as their geometry and the optical means, au depend on the focus area structure.

Figure 10:
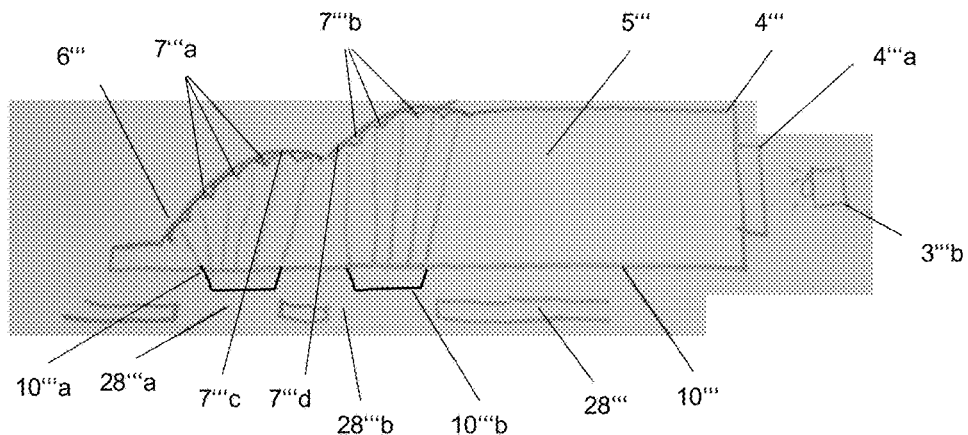
FIG. 10 is a diagram illustrating a cross sectional view of a further alternative illumination device with a selectively emitting light guiding device of the invention.

FIG. 10 depicts an alternative embodiment with an LED 3''', a light funnel 5''' being provided with a lens 4'''a at its light incoupling side 4''' and two layers of optical elements, including not only optical elements 7'''a and 7'''b on its reflection side 6''' in analogy to those described with respect to FIG. 9, but also optical elements 7''' c and 7''' d. The optical elements 7''' c and 7''' d may provide a main or first pillow structure for defining a main light direction and the optical elements 7'''a and 7'''b may define a second pillow structure supporting the main light direction but to achieve a higher homogeneity within the light windows 10'''a and 10'''b to optimize the illumination of the openings 28'''a and 28'''b of the mask 28'''.

Figure 11:
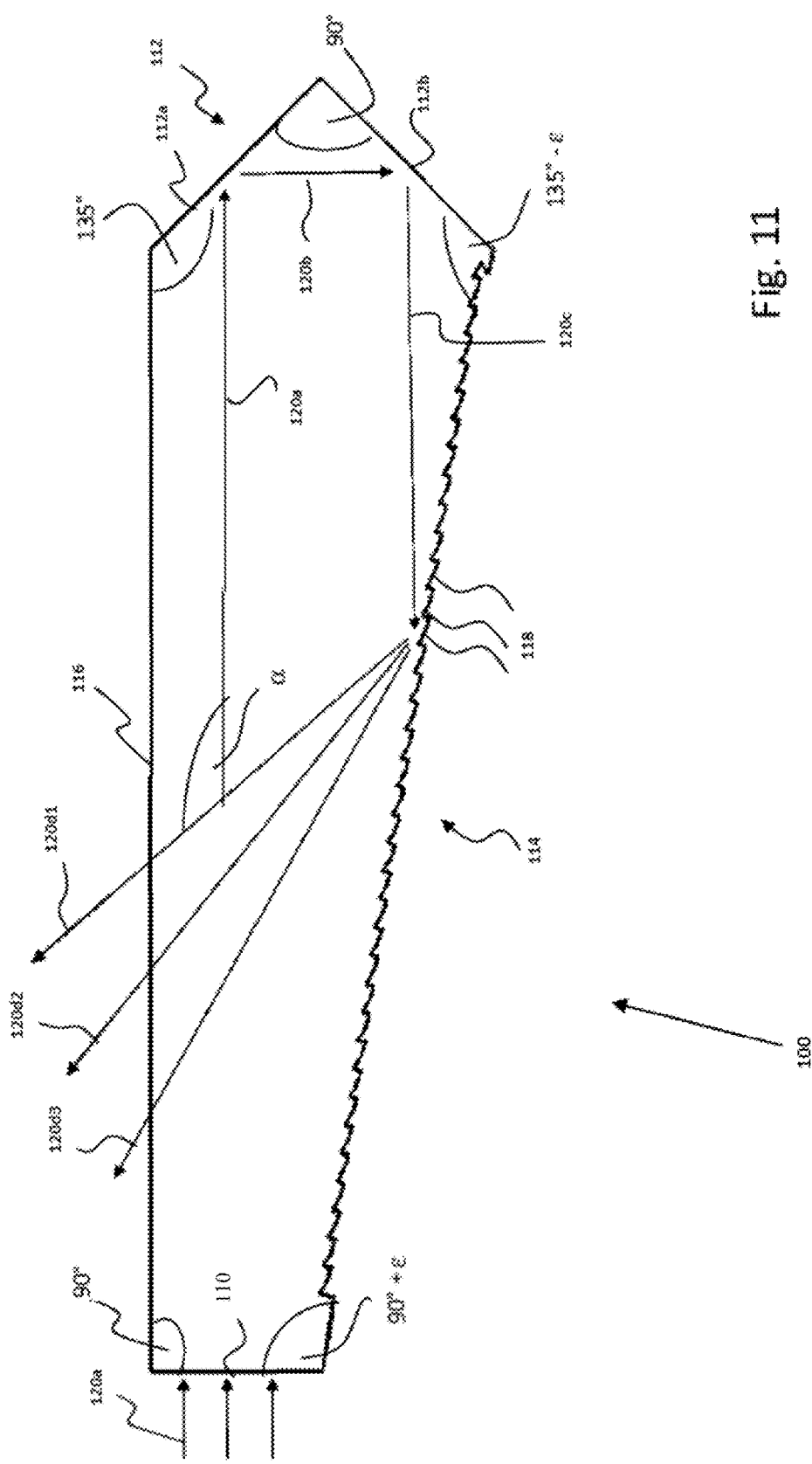
FIG. 11 is a diagram illustrating a cross-sectional view of an example of an optical waveguide.
Figure 12:
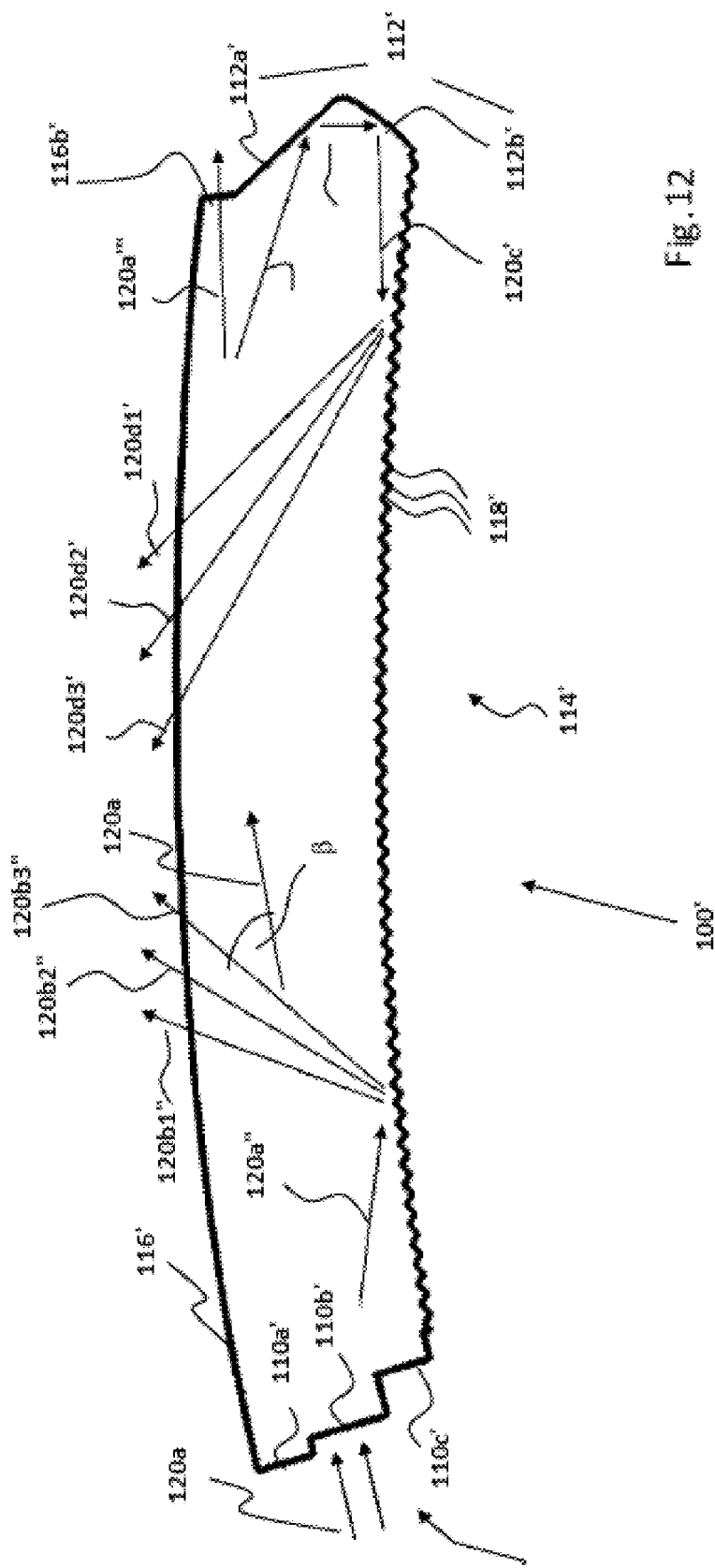
FIG. 12 is a diagram illustrating a cross-sectional view of another example of an optical waveguide.

Referring to FIG. 11, a cross-sectional view of an example of an optical waveguide is illustrated. The light guide 100 in FIG. 1 has an incoupling surface 110 at a first end face, and at the opposite end face a first reflection surface 112, which includes two subareas 112a, 112b. On a rear side of the light guide 100, a second reflection surface 114 is provided, and on a front side of the light guide 100, a decoupling surface 116. All surfaces 110, 112, 114 and 116 together form the outer contour of the light guide, which may be injection molded entirely from a transparent plastic. The optical behavior of light at these surfaces is thus defined by the optical transition from the transparent plastic to air.

The decoupling surface 116 may be perpendicular to the coupling surface 10, and both may be flat. The first partial surface 112a may be flat and at an angle of 135° to the decoupling surface. The second partial surface 112b may be equally flat, and the two partial surfaces 112a and 112b may be at right angles with respect to each other. In an example, the second reflection surface 114 is not parallel to the decoupling surface, but deviates by an angle ε so that it stands at an angle of 135°−ε with respect to the second part surface 112b and at an angle of 90°+ε with respect to the coupling surface 110. The second reflecting surface may have a small-scale structure 118, such as small prisms (conventional retroreflectors), a sawtooth profile with pointed saw teeth, a rounded tooth, a cushion, and the like.

If by means of a light source (such as a light-emitting diode) light beams 120a coupled via the coupling surface 110 in the light guide 100, for example, by vertical incidence of light on the coupling surface 110, a light beam 120a passes to the first partial surface 112a of the first reflection surface where it meets an incident angle of 45°. The light beam 120a is correspondingly reflected in the angle of 45° and impinges on the second surface 112a of the first reflection surface at the incident angle of 45° and is correspondingly reflected in the angle of 45°; that is, in the exact opposite direction to the incident light beam 120a reflected. Since the second reflection surface 114 is inclined, the light beam 120c traveling in the opposite direction is incident on it. There, the structures 118 of the second reflection surface 114 bring about yet another reflection, which can take place as a function of the impact point on the structures according to the light beams 120d1, 120d2, 120d3. These light beams may radiate in at least 15° from each other different angles through the decoupling surface 16 therethrough. The different angles already arise when the points of impact are spaced apart by a few millimeters, for instance, by 2 mm.

The most highly reflected light beam 120d1 may further have a component in the opposite direction to the coupled-in light beam 120a, that is not perpendicular but at an angle α of between 90° and 180°, i.e. at an obtuse angle. The light guide 100 may be so used in rearview devices with integrated turn signals or warning lights, where the light source may be located as close as possible to the vehicle body.

Referring to FIG. 2, the light guide 100' may have comparable features as the light guide 100 of FIG. 1. Corresponding elements and light rays are denoted by the same reference numerals as in FIG. 1, which here an apostrophe ("'") follows. The differences with respect to the light guide 100 are described below. In this example, the effect should be that light is emitted in angular ranges which are not irradiated in the light guide 100.

In this example, the coupling-in surface 110' is stepped and formed from three partial surfaces 110a', 110b ', 110c'. The second reflection surface 114' and the decoupling surface 116' may both be curved in the same direction, preferably with concentric or at least approximately parallel contours. At the second end face, a second coupling-out surface 116b' may be provided, and the first reflecting face 112' may include rounded faces 112a', 112b'.

The beam path here may also include the light beams 120a ', 120b', 120c ', which leads to light emission with component in the return direction to the coupling direction, see light beams 120d1', 120d2', 120d3'. However, other light beams 120a" may be reflected so that light beams 120b1", 120b2", 120b3" result, which are at an acute angle β, that is smaller than 90°, to the coupling-in direction according to light beams 120a. Further, light beam portions 120a''' may pass without reflection through the second outcoupling surface 116b' to the outside.

The light guide 100' may be used in a turn signal which is integrated in a rear view device because of its radiation in different directions.

Different functions and devices may be incorporated into and/or controlled with the help of rear view devices including especially cameras.

Especially useful are functions and devices to enhance, extend and/or sustain the functionality of the rear view device during normal or extreme conditions. This may include heating and/or cooling means, cleaning means such as wipers, liquid and/or gaseous sprays, actuator means for moving the rear view device or parts of it, such as for example a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore it can include linear tracks and/or rotating wheels, like for example a filter wheel, for exchanging optical elements, including for example lenses, mirrors, light sources, sensors, adaptive optics like deformable mirrors and/or filters.

Prominent examples for functions and devices incorporated into and/or controlled with the help of rear view devices include also illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices may include for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An example for a rear view device including an illumination device fulfilling the brake light functions is disclosed in German patent application No. 102012108488, filed on Sep. 11, 2012 for REAR VIEW ASSEMBLY FOR MOTOR VEHICLE and hereby incorporated herein by reference. A light guidance unit for an illumination device used in a back vision system is disclosed in German patent application No. 102012104529, filed on May 25, 2012 for LIGHT GUIDANCE UNIT which is hereby incorporated herein by reference. An illumination device for a rear view device is disclosed in German patent application No. 102012107833, filed on Aug. 24, 2012 for ILLUMINATION DEVICE AND REAR VIEW DEVICE which is hereby incorporated herein by reference. A lighting device for a back-vision unit is disclosed in German patent application No. 102012107834, filed on Aug. 24, 2012 for LIGHTING DEVICE AND BACK-VISION UNIT which is hereby incorporated herein by reference. A housing and display device of a rear view device is disclosed in European patent No. 2738043, filed on Dec. 3, 2012 for HOUSING AND DISPLAY DEVICE which is hereby incorporated herein by reference. An optical light guide for a vehicle lighting unit is disclosed in European patent No. 2947378, filed on May 22, 2014 for OPTICAL LIGHT GUIDE FOR A VEHICLE LIGHTING UNIT which is hereby incorporated herein by reference. A display device of a rear view device of a vehicle is disclosed in International patent application No. 2015/173695, filed on May 7, 2015 for DISPLAY DEVICE, REAR VIEW DEVICE AND MOTOR VEHICLE and claiming priority to European patent application No. 2944866, filed on May 12, 2014 for OPTICAL UNIT, DISPLAY DEVICE, REAR VIEW DEVICE AND MOTOR VEHICLE INCLUDING THE SAME which are all hereby incorporated herein by reference. Further a light guiding device for an illumination device, in particular for a motor vehicle or a display device, in a rear view device of a motor vehicle is disclosed in European patent application No. 3045944, filed on Jan. 19, 2015 for LIGHT GUIDING DEVICE which is hereby incorporated herein by reference. Still further a light guiding device for an illumination device, especially for a motor vehicle or an indicator device in a rear view device of a motor vehicle is disclosed in U.S. patent application Ser. No. 15/228,566, filed on Aug. 4, 2016, for LIGHT GUIDING DEVICE and is a continuation-in-part of U.S. patent application Ser. No. 15/000,733, filed on Jan. 19, 2016 for LIGHT GUIDING DEVICE which are all hereby incorporated herein by reference. In addition, an illumination device, particularly for a rear-view device of a motor vehicle and a method for producing the same are disclosed in International patent application No. 2016/147154, filed on Mar. 18, 2016 for ILLUMINATION DEVICE AND METHOD FOR PRODUCING AN ILLUMINATION DEVICE and claiming priority to German patent application No. 102015104163, filed on Mar. 19, 2015 for ILLUMINATION DEVICE AND METHOD FOR PRODUCING AN ILLUMINATION DEVICE which are all hereby incorporated herein by reference. An improved rear-view device for a motor vehicle which includes an electronic device is disclosed in U.S. patent application Ser. No. 15/256,532, filed on Sep. 3, 2016 for ELECTRONIC DEVICE AND REAR-VIEW DEVICE and claiming priority to European patent application No. 3139711, filed on Sep. 3, 2015 for ELECTRONIC DEVICE AND REAR VIEW DEVICE which are all hereby incorporated herein by reference. A lighting device for a rear view device or a footwell device of a vehicle, including at least one luminous means is disclosed in German patent application No. 102015115555, filed on Sep. 9, 2015 for ILLUMINATION DEVICE, REAR VIEW DEVICE, FOOTWELL DEVICE AND VEHICLE which is hereby incorporated herein by reference. A light module for a light assembly of an exterior rear view device is disclosed in European patent application No. 3138734, filed on Sep. 3, 2015 for LIGHT MODULE, LIGHT ASSEMBLY AND REAR VIEW DEVICE FOR A VEHICLE which is hereby incorporated herein by reference. A lighting device for a vehicle component, in particular for a rear view device of a motor vehicle, including a logo lamp and a deflection mirror are disclosed in European patent application No. 3144183, filed on Sep. 13, 2016 for LIGHTING DEVICE, VEHICLE COMPONENT AND VEHICLE and claiming priority to German utility patent application No. 202015104894, filed on Sep. 15, 2015 for LIGHTING DEVICE, VEHICLE COMPONENT AND VEHICLE which are all hereby incorporated herein by reference.

A camera module can include in particular a plurality of different optical elements, including a.o. a variety of sensors and light sources, as well as housing parts.

The housing of a camera module can be made out of plastic, metal, glass, any other suitable material and/or any combinations thereof and can be used in combination with the techniques described below to change or modify the properties of the material or the material surface. Housings are for example described in German patent application No. 102016108247.3, filed on May 3, 2016 for CLEANING SYSTEM FOR A CAMERA and U.S. patent application Ser. No. 15/281,780, filed Sep. 30, 2016 for TELESCOPING REAR VIEW ASSEMBLY WITH CAMERA AND LENS WIPING SYSTEM, which are all hereby incorporated herein by reference.

The camera can include for example CCD or CMOS or light field sensors, as for example described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which are all hereby incorporated herein by reference. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference.

The optical elements can be molded or formed from any type of glass or any other suitable material. Glass is here used in the meaning of a non-crystalline amorphous solid showing a glass transition when heated towards the liquid state. It includes for example the group of polymeric glasses, metallic glasses, silica glasses, but any other suitable material showing the glass transition can also be used. The glass can be either in a flat, wedge, rectangular, cylindrical, spherical, conical, elliptical, and/or circular shape, as described for example in German patent application No. 102016108247.3, and German patent application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, which are all hereby incorporated herein by reference, or have a shape according to different needs or lens types. As non-limiting examples camera modules can be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German patent application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed Sep. 8, 2010 for OPTIMAL LIGHT COUPLING FOR REAR VIEW DEVICES, which are all hereby incorporated herein by reference. Another type of optical elements know to be used in camera modules are optical fibers, especially in form of fiber bundles and preferably in form of fiber bundles having an optical head, as described for example in U.S. patent application Ser. No. 09/771,140. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference.

The optical elements can be transparent as described for example in U.S. Pat. No. 8,031,224, German patent application No. 102016108247.3, and U.S. patent application Ser. No. 13/242,829, filed Sep. 23, 2011 for CAMERA ARRANGEMENT AND DOOR HANDLE FOR MOTOR VEHICLE, which are all hereby incorporated herein by reference. But the optical elements can also be semitransparent, as described in U.S. patent application Ser. No. 09/771,140 and U.S. patent application Ser. No. 13/090,127, which are all hereby incorporated herein by reference. Still further, the optical elements can be completely or partially coated with different type of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference. Preferably the optical elements are made of a scratch-proof material as described for example in German patent application No. 102016108247.3, which is hereby incorporated herein by reference. The optical elements can have uncoupling structures at certain locations of the optical elements, and an optical film, for example an extrusion film, and a molded coating can be applied as described in German patent application No. 102011103200, which is hereby incorporated herein by reference. A coating to spectrally and stress control is described in U.S. patent application Ser. No. 15/124,310, which is hereby incorporated herein by reference. Different filters can be integrated into the optical elements such as for example gray filters or polarization filters, described in U.S. patent application Ser. No. 14/809,509, filed Jul. 27, 2015 for APPARATUS FOR LIGHT INTENSITY ADJUSTMENT, which is hereby incorporated herein by reference.

Electrochromic substrates, polymer electrolytes and other charge conducting medias may be used for the optical elements based on the descriptions of European patent application No. 08103179.1, filed on Mar. 31, 2008 for PROCESS FOR PRODUCING ELECTROCHROMIC SUBSTRATES AND ELECTROCHROMIC ARTICLES MADE THEREFROM, European patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, which are all hereby incorporated herein by reference.

The camera module can also be equipped with apparatuses for light intensity adjustment as described for example in U.S. patent application Ser. No. 14/809,509 and light level intensifier tubes as described in U.S. patent application Ser. No. 09/771,140, which are all hereby incorporated herein by reference. The electrochromic substrates and devices used in European patent application No. 08103179.1, European patent No. 2202826, U.S. Pat. Nos. 7,999,992 and 8,537,451, which are all hereby incorporated herein by reference, can also be used for this purpose as well as a transflector to transmit or reflect light based on a corresponding input signal, as described in German patent application No. 102016106126.3, filed on Apr. 4, 2016 for IMAGING SYSTEM, which is hereby incorporated herein by reference.

The camera module or a cover adapted to the camera module can be moved using different actuators, drives and/or a flexible track, as for example described in German application No. 102016108247.3 and U.S. patent application Ser. No. 15/281,780, which are all hereby incorporated herein by reference.

Still further, the camera module can also include cleaning elements to clean the optical element facing outwards and being exposed to the environment. The cleaning element can for example include wipers, brushes, lips, nozzles, fans and similar elements as are described in European patent application No. 14165197.6, filed Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, German patent application No. 102016108247.3, European patent application No. 13163677.1, filed Apr. 15, 2013 for LENS WIPER, European patent application No. 15173201.3, filed Jun. 22, 2015 for LENS CLEANING WITH FLEXIBLE ACTUATOR and European patent No. 1673260, filed on Oct. 14, 2003 for CLEANING DEVICE which are all hereby incorporated herein by reference. The cleaning devices are not limited in composition, and may for example include any fabric, elastomeric, sponge, brush, or combination of these. Special wiper elements including wiper arms, wiper blades, wiping cloth, wiping tissue and combinations thereof are described in European patent application No. 14165197.6, which is hereby incorporated herein by reference. A wiper element may for example be controlled according to the method described in European patent application No. 130164250.6, filed Apr. 18, 2013 for METHOD FOR CONTROLLING A WIPER DEVICE, which is hereby incorporated herein by reference. A reservoir for holding a cleaning liquid as described in European patent application No. 14165197.6, which is hereby incorporated herein by reference. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, which are all hereby incorporated herein by reference.

Also light sources can be installed or integrated into the camera module to increase the visibility of surrounding objects, measure distances and directions and detect dirt, such as described in U.S. Pat. No. 8,031,224, U.S. patent application No. 62/470,658, filed on Mar. 13, 2017, 2016 for LIGHT EMITTING MIRROR BEZEL and U.S. patent application Ser. No. 09/771,140, which are all hereby incorporated herein by reference.

Different heating means, like heating coils, heating devices integrated into the lens holder or the bezel, or other heating elements can be used to impede condensation and icing at the surface of optical elements, as for example described in German patent application No. 102016108247.3, U.S. patent application No. 62/470,658, and German patent application No. 102016107545.0, filed on Apr. 22, 2016 for HEATING DEVICE FOR A CAMERA LENS, which are all hereby incorporated herein by reference.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0, which is hereby incorporated herein by reference.

A conductor track can be embedded within plastic parts of the camera module as described in European patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, which are all hereby incorporated herein by reference.

The camera module can include a power harvesting system as described for example in European patent application No. 09171683.7, filed on Sep. 29, 2009 for SELF SUSTAINING REAR VIEW MIRROR, which is hereby incorporated herein by reference.

A fault detection system for electric consumers as described in U.S. Pat. No. 8,487,633 filed on Jan. 14, 2010 for FAULT DETECTION OF ELECTRIC CONSUMERS IN MOTOR VEHICLES, which is hereby incorporated herein by reference, can be used to detect failure of the camera module.

Different types of fixings can be used to fix the camera module to the vehicle or other components, such as for example the snap-fit connection described in European patent No. 2233360, filed on Mar. 27, 2009 for SNAP FIT CONNECTION IN A REAR VIEW MIRROR, which is hereby incorporated herein by reference.

Different control means and analyzing devices can be used, such as the computation units described in U.S. patent application Ser. No. 13/090,127, German patent application No. 102016106126.3, German patent application No. 102011053999, European patent No. 2146325, filed on July 16, for Recording Device for Receiving, Processing and Storing Image Files in a Vehicle and Method, and U.S. Pat. No. 8,849,104, filed on Jul. 16, 2008 for RECORDING DEVICE AND METHOD FOR CAPTURING AND PROCESSING IMAGE DATA IN A VEHICLE, which are all hereby incorporated herein by reference. In addition, HDR (high dynamical range) technology can be used according to U.S. patent application Ser. No. 14/830,406, filed on Aug.

19, 2015 for REAR VIEW DEVICE FOR A MOTOR and published as US 20150358590, which is hereby incorporated herein by reference.

The principle and mode of operation of this invention have been explained and illustrated in its preferred embodiment. However, it must be understood that this invention may be practiced otherwise than as specifically explained and illustrated without departing from its spirit or scope.

REFERENCE SIGNS 2, 2' light guiding device
3'a, 3'b, 3'c, 3", 3'" LED
4, 4', 4", 4'" light incoupling side
4"a, 4'"a lens
5a, 5b, 5c, 5'a, 5'b, 5'c, 5", 5'" funnel
6, 6", 6'" reflection side
7"a, 7"b, 7'"a, 7'"b first optical element
7'"c, 7'"d second optical element
8 reflection layer
9' light guide body
10, 10', 10", 10'" light outcoupling side
10', 10'a, 10'b, 10'c, 10"a, 10"b, 10'"a, 10'"b light outcoupling window
12 holding device
14 breaking point
15 breaking point
16, 16' illumination device
18 light source
20 printed circuit board
22 rear view device
24 reflection surface
26 heating layer
28 icon
28", 28'" mask
28"a, 28"b, 28'"a, 28'"b opening
30 recess
31 white sheet
32 backing plate
32a opening
100, 100' optical fiber
110, 110' coupling surface
110a', 110b', 110c' subfaces of the coupling surface
112, 112' first reflection surface
112a, 112b, 112a', 112b' partial surfaces of the first reflection surface
114, 114' second reflection surface
116, 116' decoupling surface
116b' second decoupling surface
118, 118' structures in the second reflection surface
120a, 120b, 120c, 120d1, 120d2, light rays
120d3, 120a', 120b', 120c', 120d1',
120d2', 120d3', 120a", 120b1",
120b2", 120b3", 120a'"
α, β angles

What is claimed is:

1. A light guide for use in a light emitting device of a vehicle, comprising:
a coupling surface for coupling light into the light guide;
a first reflection surface which at least partially reflects incident light by a first angle;
a second reflection surface which at least partially reflects incident light by a second angle; and
a decoupling surface for coupling out light;
wherein the coupling surface, the first reflection surface, the second reflection surface and the decoupling surface are connected to one another,
wherein the coupling surface, the first reflection surface, the second reflection surface and the decoupling surface are arranged so that in response to light beams being irradiated at an irradiation direction, at least a first portion of the light beams are reflected by the first angle upon incidence with the first reflection surface, and are reflected by the second angle upon incidence with the second reflection surface so that light rays are directed towards the outcoupling surface and exit via an exit direction of the light guide which forms an obtuse angle with respect to the irradiation direction,
wherein the coupling surface, the second reflection surface, and the decoupling surface are arranged so that during coupling of light beams in a direction of incidence, a second portion of the light beams from a second region on the second reflection surface reflects the light beams at least partially in such a way that the light beams pass in an irradiation direction from the light guide with the irradiation direction enclosing an acute angle, and
wherein at least one of the first reflection surface and the second reflection surface have a structure that in various regions of the respective reflection surfaces which are spaced from one another by at most 10% the longest side of the light guide, the first and second light beams are reflected up to 15° from each other in different directions, or the at least one of the first reflection surface and the second reflection surface have a structure such that in various regions of the respective reflection surfaces which are spaced apart by a maximum of from 0.5 mm to 2 mm, the first and second light beams are reflected in different directions by 15° from one another.

2. The light guide according to claim 1, wherein the light guide is formed entirely of plastic.

3. The light guide according to claim 1, wherein at least one of the first reflection surface and the second reflection surface is non-planar.

4. The light guide according to claim 1, wherein at least one of the first reflection surface and the second reflection surface has a plurality of similar structures which are formed as optical elements in the form of prisms or cushions.

5. The light guide according to claim 4, wherein the plurality of similar structures each comprise at least two partial surfaces which are at an angle of between 80° and 100° to one another.

6. The light guide according to claim 1, wherein the first reflection surface is a two-part surface comprises two sides which are at an angle of 90° to one another other, and form an angle of 135° with respect to the decoupling surface so that a total reflection occurs.

7. The light guide according to claim 1, further comprising a second output surface which is formed adjacent to the first reflecting surface and arranged in a predetermined direction of incidence on so that at least a portion of non-reflected rays of light exit therethrough.

8. The light guide according to claim 1, wherein an intensity of the light beams which exit from the light guide at an obtuse angle is at least 25% with respect to the intensity of injected light.

9. The light guide according to claim 1, wherein at least one of the first reflection surface and the second reflection surface has a reflective coating.

10. A light-emitting device comprising the light guide according to claim 1.

11. A vehicle comprising a turn signal as a light-emitting device comprising the light guide according to claim 1.

12. A vehicle comprising a warning light as a light-emitting device comprising the light guide according to claim 1.

13. A vehicle according to claim 1, wherein the light emitting device is in an outer rear view mirror unit.

14. A light guide for use in a light emitting device of a vehicle, comprising:
- a coupling surface for coupling light into the light guide;
- a first reflection surface which at least partially reflects incident light by a first angle;
- a second reflection surface which at least partially reflects incident light by a second angle; and
- a decoupling surface for coupling out light,
- wherein the coupling surface, the first reflection surface, the second reflection surface and the decoupling surface are connected to one another,
- wherein the coupling surface, the first reflection surface, the second reflection surface and the decoupling surface are arranged so that in response to light beams being irradiated at an irradiation direction, at least a first portion of the light beams are reflected by the first angle upon incidence with the first reflection surface, and are reflected by the second angle upon incidence with the second reflection surface so that light rays are directed towards the outcoupling surface and exit via an exit direction of the light guide which forms an obtuse angle with respect to the irradiation direction,
- wherein the coupling surface, the second reflection surface, and the decoupling surface are arranged so that during coupling of light beams in a direction of incidence, a second portion of the light beams from a second region on the second reflection surface reflects the light beams at least partially in such a way that the light beams pass in an irradiation direction from the light guide with the irradiation direction enclosing an acute angle,
- wherein at least one of the first reflection surface and the second reflection surface has a plurality of similar structures which are formed as optical elements in the form of prisms or cushions, and
- wherein the plurality of similar structures each comprise at least two partial surfaces which are at an angle of between 80° and 100° to one another.

15. A light guide for use in a light emitting device of a vehicle, comprising:
- a coupling surface for coupling light into the light guide;
- a first reflection surface which at least partially reflects incident light by a first angle;
- a second reflection surface which at least partially reflects incident light by a second angle; and
- a decoupling surface for coupling out light,
- wherein the coupling surface, the first reflection surface, the second reflection surface and the decoupling surface are connected to one another,
- wherein the coupling surface, the first reflection surface, the second reflection surface and the decoupling surface are arranged so that in response to light beams being irradiated at an irradiation direction, at least a first portion of the light beams are reflected by the first angle upon incidence with the first reflection surface, and are reflected by the second angle upon incidence with the second reflection surface so that light rays are directed towards the outcoupling surface and exit via an exit direction of the light guide which forms an obtuse angle with respect to the irradiation direction,
- wherein the coupling surface, the second reflection surface, and the decoupling surface are arranged so that during coupling of light beams in a direction of incidence, a second portion of the light beams from a second region on the second reflection surface reflects the light beams at least partially in such a way that the light beams pass in an irradiation direction from the light guide with the irradiation direction enclosing an acute angle, and
- wherein the first reflection surface is a two-part surface comprises two sides which are at an angle of 90° to one another other, and form an angle of 135° with respect to the decoupling surface so that a total reflection occurs.

16. A light guide for use in a light emitting device of a vehicle, comprising:
- a coupling surface for coupling light into the light guide;
- a first reflection surface which at least partially reflects incident light by a first angle;
- a second reflection surface which at least partially reflects incident light by a second angle;
- a decoupling surface for coupling out light; and
- a second output surface which is formed adjacent to the first reflecting surface and arranged in a predetermined direction of incidence on so that at least a portion of non-reflected rays of light exit therethrough,
- wherein the coupling surface, the first reflection surface, the second reflection surface and the decoupling surface are connected to one another,
- wherein the coupling surface, the first reflection surface, the second reflection surface and the decoupling surface are arranged so that in response to light beams being irradiated at an irradiation direction, at least a first portion of the light beams are reflected by the first angle upon incidence with the first reflection surface, and are reflected by the second angle upon incidence with the second reflection surface so that light rays are directed towards the outcoupling surface and exit via an exit direction of the light guide which forms an obtuse angle with respect to the irradiation direction, and
- wherein the coupling surface, the second reflection surface, and the decoupling surface are arranged so that during coupling of light beams in a direction of incidence, a second portion of the light beams from a second region on the second reflection surface reflects the light beams at least partially in such a way that the light beams pass in an irradiation direction from the light guide with the irradiation direction enclosing an acute angle.

* * * * *